United States Patent [19]

Fernicola

[11] 3,968,340

[45] July 6, 1976

[54] MIG STARTING SYSTEM

[75] Inventor: Robert Charles Fernicola, Florence, S.C.

[73] Assignee: Union Carbide Corporation, New York, N.Y.

[22] Filed: July 3, 1974

[21] Appl. No.: 485,746

[52] U.S. Cl. .................................. 219/131 F; 314/62
[51] Int. Cl.² .......................................... B23K 9/12
[58] Field of Search ........... 219/131 F, 135, 137 PS; 314/62, 65, 68, 69, 75

[56] References Cited
UNITED STATES PATENTS

| | | |
|---|---|---|
| 2,806,127 | 9/1957 | Hackman et al. ............... 219/135 X |
| 3,546,423 | 12/1970 | Chopp et al. ..................... 314/68 X |
| 3,731,049 | 5/1973 | Kiyohara et al. ................ 219/131 F |
| 3,736,403 | 5/1973 | Rogers et al. ................... 219/131 F |

*Primary Examiner*—Arthur T. Grimley
*Assistant Examiner*—Clifford C. Shaw
*Attorney, Agent, or Firm*—John R. Doherty

[57] ABSTRACT

The starting system includes circuit means which is responsive to the short circuit condition for maintaining the electrode feed rate at the inch setting for a predetermined period of time sufficient to enable an arc to firmly establish itself.

4 Claims, 1 Drawing Figure

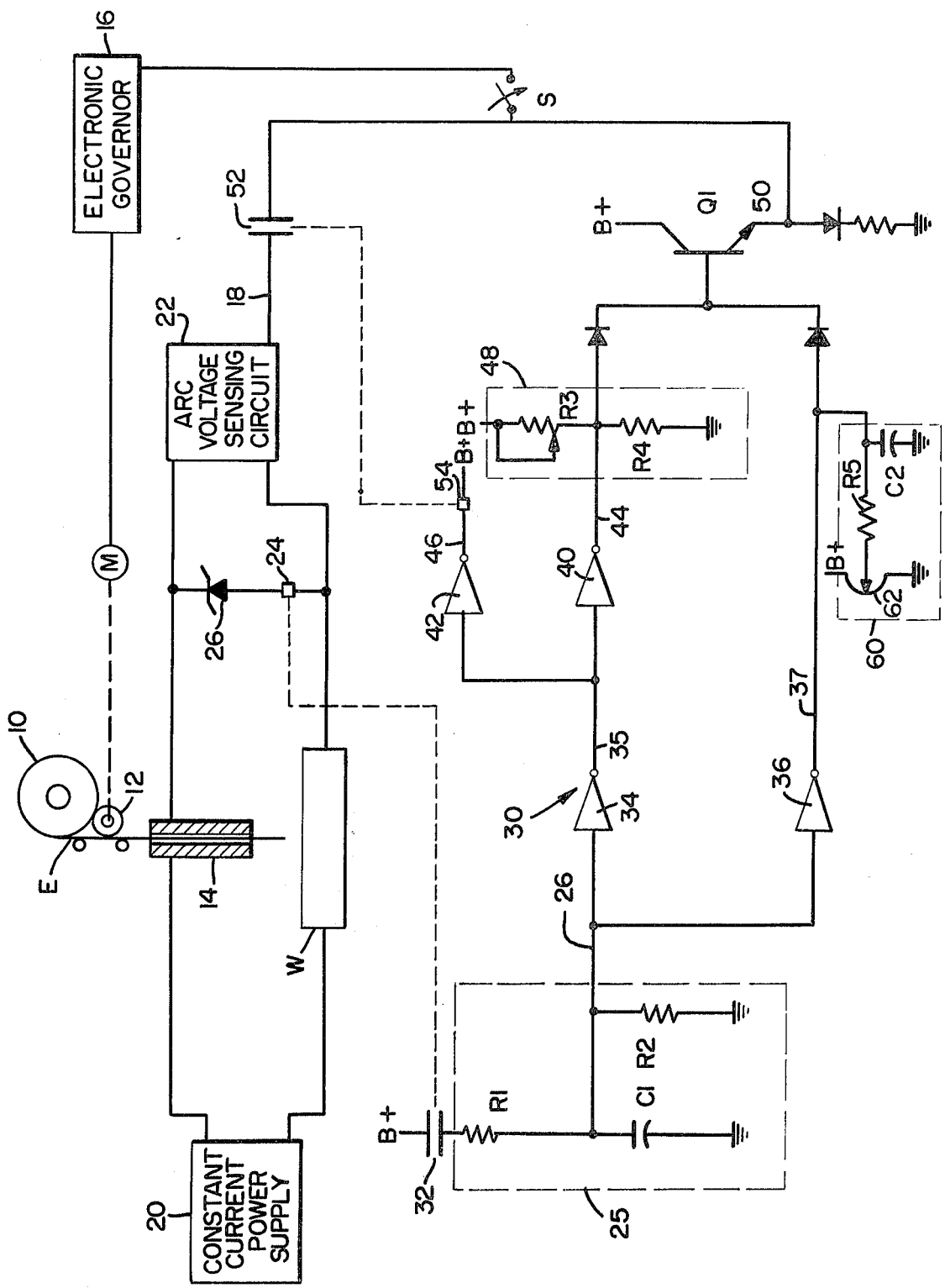

MIG STARTING SYSTEM

This invention relates to arc starting systems and more particularly to a consumable electrode inert gas shielded arc starting system for use in conjunction with a constant current power source.

It is a conventional practice in MIG welding from a constant current power supply to regulate the consumable electrode feed rate using the arc voltage as the feedback control variable. It is also known to provide the welding operator with an adjustable wire feed speed control so that an arc may be established by advancing the wire electrode into contact with the workpiece at a feed rate different from the desired welding feed rate. This is particularly advantageous when welding with aluminum wire. In such an application if the wire is advancing at too fast a rate when it comes into contact with the work it may possibly buckle or will at the very least make arc starting more difficult. Hence in general, and for welding with aluminum wire in particular, the operator would prefer to use a slower and preferably adjustable inching speed for starting the arc and thereafter a higher feed rate for welding. Where the operation of starting from a slower inching speed and changing to a faster operating speed is mechanized or automated the probability of premature speed crossover before the arc has been firmly established is substantially increased. This could cause arc sputtering and/or cause the aluminum wire electrode to curl against the surface of the workpiece.

It is therefore the principal object of the present invention to provide an arc starting system suitable for welding with consumable wire electrodes from a constant current source of power.

It is a further object of the present invention to provide an arc starting system for MIG welding from a constant current power supply which advances the electrode at an inching speed to establish the arc and substantially switches to a faster welding speed after the arc is established while mitigating against the possibility of a premature speed crossover.

Other objects and advantages of the present invention will become apparent from the following detailed description of the invention when taken in connection with the accompanying electrical schematic circuit diagram illustrating the starting system of the present invention.

Referring to the accompanying drawing in which a consumable electrode E, composed of a metal such as aluminum and in the form of a rod, is drawn from a reel 10 by a feed roll 12 through a contact tube 14 of a conventional arc working torch (not shown) which may be either manually operated or mechanized. The feed roll 12 is driven by a motor M which is in turn controlled by a conventional electronic governor 16. The governor 16 drives the motor M at a speed set in response to speed control information provided by the arc starting system of the present invention, as will be discussed more thoroughly hereafter, in addition to other information unrelated to the arc starting electrode feed rate information.

A power supply 20 of the constant current type having an open circuit output voltage in the range of about 70–80 volts is impressed in parallel across the electrode E to workpiece W. Also in parallel with the electrode E and workpiece W is a conventional arc voltage sensing circuit 22 and a series circuit, which forms part of the arc starting system of the present invention, consisting of a voltage relay 24 and a zener diode 26. The arc voltage sensing circuit 22 provides an output voltage 18 which is proportional to the voltage across the arc and which is used in a conventional manner as a variable feedback input signal to the motor governor control 16 for adjusting the feed rate of the electrode in response to variations in the arc voltage level.

The arc starting system of the present invention includes the series circuit of voltage relay 24 and zener diode 26 and a circuit network 30. The sequence for establishing an arc in accordance with the present invention involves sensing an open circuit between the electrode E and workpiece W; advancing the electrode toward the workpiece W at an initial first rate of speed in response to such open circuit condition, sensing the short circuit condition between the electrode E and the workpiece W; and switching to a higher operating and voltage controlled electrode feed rate at a predetermined period of time after the short circuit condition is established.

A switch S, which for simplicity is shown as a manually operated control, connects the circuit network 30 to the governor control 16. Switch S should be closed in conjunction with the energization of the power supply 20. The voltage relay 24 is energized in response to an impressed power supply voltage representing an open circuit across the electrode E to workpiece W. Energization of the voltage relay 24 at a predetermined voltage somewhat below the open circuit voltage but at a voltage higher than the normal welding voltage is assured by the zener diode 26. Upon the activation of voltage relay 24, its contact 32 closes enabling a charging circuit 25 composed of capacitor C1 and resistor R2 in parallel with one another and connected in series with resistor R1. Resistor R1 is preferably of very low resistance and of substantially lower magnitude than resistor R2 which functions primarily to control the discharge of capacitor C1. Thus, as soon as contact 32 closes capacitor C1 will charge rapidly through resistor R1 and essentially to the full DC level B+.

The output 26 of the charging circuit 25 is connected in common to a pair of conventional solid state inverters 34 and 36 respectively. The inverters are of the open collector type with their outputs 35 and 37 at substantially infinite impedance for a low signal input and of substantially zero impedance for a high signal input. Thus the output 37 of inverter 36 is essentially grounded when the output 26 of charging circuit 25 is at full charge. On the other hand, the output 35 of inverter 34 is fed to inverters 40 and 42 reinverting the low input to a high output impedance at outputs 44 and 46 respectively. With the output 44 at high impedance, voltage divider 48, consisting of resistors R3 and R4, is enabled providing a DC output level through the output emitter follower Q1 at 50. The output signal 50 is applied to the motor governor 16 and represents the initial inch speed at which the electrode E is advanced toward the workpiece W. Resistor R3 can be varied manually to permit adjustment of the inching speed.

During this interval the arc voltage sensing circuit 22 is disabled by the opening of contact 52 of relay 54. Relay 54 is in a normally energized state and is deenergized when the output 46 of inverter 42 is open circuited, i.e., of substantially infinite impedance. Thus, the only speed information received by the governor circuit 16 before an arc is established is derived from the inching control resistor R3 of the voltage divider 48.

Once the voltage impressed across the arc has dropped to a sufficiently low value, which will occur when contact is established between the electrode E and workpiece W, relay 24 will deenergize and its contact 32 will open. This will disable charging circuit 25 and capacitor C1 will begin to exponentially discharge through resistor R2. Resistor R2 is chosen of such value as to delay the rate of discharge of capacitor C1 over a predetermined time period so as to hold in the electrode feed rate at the initial inching speed. A delay of up to 40 milliseconds has been noted. A time delay of this magnitude should be more than sufficient to permit an arc to become firmly established. During this delay period the electrode is still being fed at the initial inch speed which then causes the electrode to bounce along the surface of the workpiece thus assisting the initiation of an arc. The delay is actually made possible because of the conventional inverter circuits 34 and 36 which require a relatively substantial drop in input signal to cause an inversion to take place. Once the output 26 of charging circuit 25 has discharged to a sufficiently low level the inverters revert back to the original deenergized state with the output 44 of inverter 40 essentially grounded and the output 37 of inverter 36 open circuited. The variable weld speed control circuit 60 is then enabled. Circuit 60 consists of variable potentiometer 62, capacitor C2 and resistor R5. Superimposed on the output 50 from the weld speed control circuit 60 would be the conventional information received from the arc voltage sensing circuit 22 through closed contact 52 which returns to its closed position upon the reenergizing of relay 54. Relay 54 reenergizes when the output 26 has decayed to a level sufficient to reinvert the output 35 of inverter 34 back to a high impedance state which in turn reinverts the output 46 of inverter 42 back to a low impedance.

Once an arc is established the arc voltage sensing circuit 22 provides an output which is superimposed on the output from the weld speed control 60. The electrode feed rate is therefore relatively slowly adjusted from the inch speed to the final welding speed as the arc length increases to the operating arc length.

What is claimed:

1. A starting system for establishing an inert gas shielded arc between a consumable wire electrode and a workpiece from a constant current power supply which comprises, in combination: a control circuit, said control circuit comprising:
   a. means responsive to the voltage across the electrode to workpiece for providing a DC output signal of a first predetermined magnitude when said voltage exceeds a first predetermined level representative of an open circuit;
   b. means for decreasing said DC output signal over a predetermined time period to a second predetermined magnitude when said voltage drops below a second predetermined level representative of a short circuit; and
   c. means responsive to said first predetermined magnitude for providing a first speed control signal and to said second predetermined magnitude for providing a second speed control signal; and
means for automatically advancing said wire electrode toward the workpiece at a starting rate of speed to establish the arc in response to said first speed control signal and at a normal welding rate of speed in response to said second speed control signal.

2. A starting system as defined in claim 1 wherein said consumable wire electrode is composed of aluminum.

3. A starting system as defined in claim 2 wherein said means for decreasing said DC output signal over a predetermined time period comprises a discharging circuit including a capacitor and resistor.

4. A starting system as defined in claim 3 wherein said means for providing said first and second speed control signals respectively comprises:
   first means for generating said first speed control signal;
   second means for generating said second speed control signal; and
   gating means for enabling said first means and disabling said second means in response to said first predetermined magnitude and for enabling said second means and disabling said first means in response to said second predetermined magnitude.

* * * * *